Patented Sept. 25, 1945

2,385,371

UNITED STATES PATENT OFFICE 2,385,371

ABRASIVE ARTICLE AND METHOD OF MANUFACTURING THE SAME

Philip Hamilton Rhodes, Portland, Maine, assignor to Pennsylvania Coal Products Company, Petrolia, Pa., a corporation of Pennsylvania No Drawing. Application November 13, 1941,
Serial No. 419,029

16 Claims. (Cl. 51—298)

The present invention relates to the production of an abrasive article, and more particularly to an abrasive article in which the abrasive particles or grains are cemented together by a synthetic resorcin resin or a resin having as one of its constituents a resorcin resin, the resorcin resin and/or the composite resin being capable of curing at temperatures considerably lower than that of the phenolic resins now commonly used as a bonding or cementing medium in the production of abrasives, and, additionally, the cure takes place in less time than that now required for the commonly used phenolic bonding agents. Further, the resorcin resin bond of the herein described abrasive is characterized by a low percentage of volatile matter, mainly water, at curing temperature, a high bond strength, and is capable of resisting a high temperature, as for example, that frictionally generated in the use of grinding stones, the present invention being particularly applicable to the production of the latter. Due to the hardness of the cured resorcin-containing resin, and the completeness of cure when the abrasive medium bonded with the resorcin-containing resin is subjected to heat treatment, the resorcin-containing bonding resin of the abrasive medium is more resistant to destruction by extraneous forces, such as frictional heat, shock impact, and grinding solutions including those containing alkali components.

In the preferred form of the invention, it is desirable to wet the individual particles or grains of the abrasive so that when the latter are mixed with the herein disclosed resorcin resin bonding agent, the latter will coat the abrasive particles or grains and stick to the wetted surface of the abrasive particles to produce a homogeneous mass of abrasive and resin bond.

It has been discovered that it is highly desirable when using a thermo-setting wetting resin, herein termed a "liquid resin," that the properties of the thermo-setting resin when set be as close as possible to those of the resorcin bonding resin or the bonding resin of which the resorcin resin is a component. The wetting agent including the thermo-setting liquid resin herein set forth may have in admixture therewith a plasticizer such as dibutylphthalate, any of the glycols, or equivalent prior art plasticizers.

While the present invention is in general applicable to the manufacture of abrasive articles, it is of particular value in the preparation of grinding wheels, abrasive blocks, and bricks, lapping wheels, regulating wheels, honing sticks, and similar articles. Therefore, the invention will be specifically described in connection with the preparation of grinding wheels.

The abrasive particles or grains of the grinding wheels may comprise any of the usual grinding wheel abrasive materials in the usual grit sizes.

More particularly, the abrasive component may be garnet, emery, diamond grit, commonly designated "bort," quartz, corundum, fused alumina, or silicon carbide. The abrasive component may comprise mixtures of the usual prior art abrasive particles including any of those above set forth, and in any given size, or in the alternative, a mixture of different sizes. Often, the abrasive particles are reduced to a fineness capable of passing through an 80 mesh screen, but are held on a 200 mesh screen. This is particularly true when the abrasive component is fused alumina or diamond particles, or a mixture thereof.

In general, the abrasive particles, when a wetting agent is employed, are mixed with the wetting agent so that each particle of the abrasive is thoroughly wetted or moistened. The low curing resorcin-containing resin bonding agent, preferably in a dry powdered state, is then added to the wetted abrasive so that each abrasive particle becomes coated with the resin bonding material or agent. The "green" mass is thereafter pressed into the desired shape by either hot molding or cold molding as hereinafter more particularly pointed out. The abrasive mixture set forth may have present as components thereof fillers and extenders such as are common in the art.

In general, to 100 pounds of the abrasive, there is added from 5 to 15 pounds of a resorcin-containing resin bonding at a low temperature and produced as herein set forth or in an equivalent manner, and from 1 to 5% of a wetting agent, the percentages of the resin and wetting agent being taken upon the abrasive. In the preferred form of the invention, about 10% of the resorcin-containing resin is used, together with about 2% of the wetting agent.

The resorcin-containing cementing or bonding agent which is used in carrying out the present invention may be produced by reacting about 2500 grams of resorcin with about 500 grams of 37% formaldehyde solution in a suitable reaction vessel. Preferably, the reaction vessel comprises a steam jacketed kettle equipped with a horse-shoe agitator, a reflux condenser, and an addition valve. The formaldehyde is added to the resorcin present in the vessel and thereafter the jacket is gradually heated so that the temperature of the resorcin-formaldehyde mixture is slowly raised to 100° C. as the resorcin goes into solution, great care being taken that the mixture does not become too ebullient, and boil over. As the temperature reaches 100° C., the steam jacket is taken out of circuit and then about 750 grams of 37% formaldehyde are gradually added to the kettle. The rate of addition is governed by the temperature of the mixture. The particular mixture above set forth is not permitted to become heated to over 110° C., no boiling over occurring. As the formaldehyde is added to the partially reacted mass, heat is generated and the rate of reaction is controlled so that the heat given off is not sufficient to cause the mass to boil over. Usually, the time of addition of the formaldehyde is about 1¼ to 1½ hours. However, this will vary with the size of the reaction mass and on large scale production, may take as long as two or three hours.

On the addition of the formaldehyde to the partially reacted mass, the rate of reaction slows down. In order to combine the last traces of formaldehyde without successive advancement of the resin already formed, a catalyst is added at this stage. If this is not done and the formaldehyde is completely combined by long application of heat, part of the resin formed in the initial stages of the reaction will advance so far as to threaten gellation and perhaps inhibit the complete removal of the water. In the above, no catalyst is present. However, if a catalyst is added in the early stages of the reaction, the initial resin formation advances before the final traces of formaldehyde are tied up and thickens the mass so that it is difficult to remove the water from the reaction mass.

The addition of the catalyst at the end of the reaction ties up the last traces of formaldehyde quickly before the resin already formed has a chance to advance too far and prevent the final product from being completely dehydrated. When all the formaldehyde has been added, there is then added a suitable acid catalyst such as oxalic acid, acetic acid, citric acid, boric acid or any of the mineral acids such as sulfuric acid and hydrochloric acid. Specifically, to the mixture above set forth there may be added sufficient oxalic acid crystals to assist in completing the reaction. When the reacting ingredients are present in the proportions above set forth, 5 grams of oxalic acid crystals are sufficient to complete the reaction. Instead of adding the catalyst in a dry state, the latter may be added in solution, as for example, the oxalic acid crystals may be dissolved in water or equivalent medium.

During the time that the second addition of formaldehyde is added, heat is furnished by the exothermic reaction of the formaldehyde with the resorcin. At about the time the catalyst is added, the mass begins to slightly cool and the jacket is reheated, sufficient steam being bled in to rapidly reflux the kettle contents. As soon as the mixture has reached a smooth rapid reflux the condenser is shifted to a water jacketed downward condenser connected to a trap and vacuum pump to distill off the water from the reaction mass. The temperature is maintained by steam pressure on the jacket at about 100° C. during the distillation of the water and a vacuum of about 28 inches is maintained on the system. Distillation is continued with about 50 pounds of steam pressure on the jacket and the temperature gradually rises to 125° to 130° C. at the end of the dehydration period. The dehydration is terminated when the temperature reaches 125° to 130° C. and the distillation is practically stopped. This can be ascertained by checking on the condenser output. When it slows down to 6 or 10 drops per minute, which takes about 45 minutes using the proportions herein set forth, this may be taken as an indication that the dehydration step has terminated. At this point, the agitator is stopped, the kettle is opened, and the liquid resin is poured off. This solidifies to a brittle resin containing less than 1% moisture and usually not over 0.65% as determined by the A. S. T. M. method. Preferably the reaction is carried out between .67 of a mole of formaldehyde and one mole of resorcin in the presence of a suitable acid catalyst added after the final portion of the formaldehyde or other aldehyde has been added. Although the preferred molecular ratio of formaldehyde to resorcin is 0.67 to 1.0, other ratios from 0.5 to 1.0 to 0.9 to 1.0 may be employed. Instead of using formaldehyde, other prior art aldehydes may be used such as acetaldehyde, paraldehyde, propionaldehydes, the butyl aldehydes, the furfuralaldehydes, and the like.

While it is preferred to employ a catalyst at the end of the formaldehyde or equivalent aldehyde reaction, as set forth, the reaction between the resorcin and the aldehyde may occur in the absence of a catalyst by lengthening the reflux period after the complete addition of the formaldehyde. However, without a catalyst or when a catalyst is added in the early stages of the reaction, the resin formation in the early stages is so rapid that the mass thickens to a point where complete dehydration is difficult.

The so produced resorcin-aldehyde resin is finely ground, preferably to pass through a 100 to 200 mesh screen, and then blended with 10% of its weight of hexamethylenetetramine or other methylene-containing agent so that the mixture is completely homogeneous and easily passes the desired screen mesh. This mixture is heat reactive and furnishes the final resorcin resin.

It is desired to point out in the production of the monohydric phenol-aldehyde condensation products, the reaction is so relatively slow that dehydration is successfully accomplished without any special precautions. However, when the dihydroxy benzene-aldehyde resins are produced, the reaction between the dihydroxy benzene, as for example, resorcin, and the aldehyde, as for example, formaldehyde is so rapid that the water does not have an opportunity to escape unless the catalyst is added after the final increment of formaldehyde has been added. However, when this is done, the water is removed from the final resorcin-formaldehyde resin. As a general rule, the resins produced in accordance with the method above set forth contain less than 1% water and preferably contain between 0.5 to .75%. It may be stated that the water content affects the melting point of the final resin, the more water present, the lower the melting point. Referring to the rate and character of the final setting reaction of the resin, the more water being present, the slower the final setting and the greater tendency to form discontinuous films. The amount of water present in the final resin also affects the stability of solutions of the resin. For example, with 5% of water, a 50% solution of the above resin in alcohol will keep only a few hours; with .6% of water, the same solution will keep from 3 to 4 days without gellation.

When the resin is used as a cementing or bonding agent in the production of abrasive articles typified by grinding wheels, the presence of water tends to form steam during curing, which in turn causes blistering of the abrasive article or piece. Further, if the herein disclosed resin contains more than 1% of water, there is a tendency for the resin when used to cement abrasive grains to form discontinuous films, which reduces the bonding strength of the cementing agent.

As previously pointed out, during the production of dihydroxy benzene-aldehyde resins and particularly resorcin-formaldehyde resins, the reacting ingredients react rather rapidly, causing difficulty in controlling the course of the reaction to produce a desirable end product. When the reaction occurs so rapidly, side reactions occur, introducing by-products in the end product. It has been discovered that the rapidity of the reaction of the reacting ingredients one with the other may be decreased by having present during the reaction a monohydric phenol typified by phenol per se, cresol, or xylenol or the like. It has been further discovered that not only does the presence of a monohydric phenol during the reaction cause the reaction to proceed less rapidly, but also that the resulting resin containing the reaction product of the monohydric phenol exerts a better filming effect which, in some cases, may be advantageously utilized, as for example, in the production of abrasive articles such as grinding wheels.

More specifically, in the above example whereby 2500 grams of resorcin are reacted with about 500 grams of 37% formaldehyde, for a portion of the resorcin, there is substituted a monohydric phenol so that the mixture of resorcin and phenol reacts with the formaldehyde solution. In one form of the invention, 2250 grams of resorcin were mixed with 250 grams of pure phenol or 250 grams of crude cresylic acid and the mixture reacted with the formaldehyde solution. The resulting mass was then treated in a manner identical with that set forth for the production of the resorcin-formaldehyde resin.

The final resin which was a co-polymer of the resorcin and phenol-aldehyde combination melted at 105 to 120° C., depending on the characteristics of the particular phenol employed, as compared with 99 to 100° C. for the straight resorcin-formaldehyde resin. About five degrees higher temperature was required to get the same rate of cure as on the straight resorcin resin and the general appearance of the cured films were tougher and more homogeneous than corresponding films from the resorcin-aldehyde combination. The mixed resin was made from a mixture of 90% resorcin and 10% monohydric phenol. It is within the province of the present invention to combine the dihydroxy benzene, as for example, resorcin, catechol, hydroquinone or the like with varying percentages of the monohydric phenol, as for example, the dihydroxy benzene may comprise 80% resorcin and the monohydric phenol may comprise 20% phenol or cresylic acid. The dihydroxy benzene, as for example, resorcin may comprise 60% and the monohydric phenol may comprise 40% of a phenol which reacts with an aldehyde such as formaldehyde. The following phenol mixes may be used: 40% dihydroxy benzene, as for example, resorcin, and 60% monohydric phenol; 20% dihydroxy benzene, such as resorcin and 80% monohydric phenol, typified by phenol per se and cresylic acid. In other words, the dihydroxy benzene and the monohydric phenol may be combined in various proportions and reacted with an aldehyde such as, for example, formaldehyde; and this reaction product hardened by treatment with a methylene-containing hardening agent in order to produce resins which are easily controlled during the reaction period, have better filming effects, and which have curing temperatures intermediate between that of resorcin-aldehyde resins, as for example, resorcin-formaldehyde resins and the monohydric phenol-aldehyde resins.

In some respects, this is a great advantage since it opens up an entirely new field for the production of articles utilizing a bonding medium, curing at an exceedingly low temperature, or at least at temperatures below 135 to 150° C., which are the curing temperatures necessary when using the prior art monohydric phenol-aldehyde one- or two-step resins.

The two-step resin produced as above set forth is preferably dissolved in a mixture of equal parts of alcohol and acetone to give a solution containing from 35 to 50% solids content, depending upon the viscosity desired.

Straight solutions of these resins in alcohol or acetone are unstable tending to gel within 24 hours after their preparation. This, of course, is highly disadvantageous as the gelled resins cannot be efficiently utilized in the arts. It has been discovered that the resin may be fairly well stabilized if the solutions thereof are fairly dilute; that is, for example, less than 40% of the resin is dissolved in 60% of the alcohol or the acetone. A solution diluted in accordance with the above will keep from about 2 to 3 days.

It was also discovered that if instead of dissolving the final two-step resin in straight alcohol or straight acetone that the resorcin-formaldehyde or equivalent resin is dissolved in a mixture of alcohol and acetone, preferably in equal amounts, that the resin solution is stabilized so that it will keep for a period of 2 weeks.

It was further discovered that if a mixture of the resin solvents were used as a solvent medium and the solution were diluted so that it contained less than 40% of resin solids, that the so-prepared solution kept for a period of at least 3 or 4 weeks, with no gelling, indicating that the solution had become stabilized.

These stabilized solutions of the two-step resins prepared as herein set forth may be advantageously utilized in the production of abrasive articles of the character herein set forth.

It is desired to point out that the production of the above resin is merely illustrative and that the heat reactive resorcin resin may be produced by utilizing other procedures and, more particularly, it may be produced by utilizing the procedure set forth in copending application Serial No. 386,163.

The liquid thermo-setting wetting agent previously referred to may be made by compounding the following ingredients:

*Example 1*

| | Grams |
|---|---|
| Resorcin | 100 |
| 37% formaldehyde | 100 |
| Alcohol | 200 |
| Urea | 2 |

The resorcin is dissolved in the alcohol and the formaldehyde is then added. The mixture is then heated gradually to 92° C., at which point a small increase in viscosity is apparent after about 5 minutes. The mixture is then cooled to room temperature and to the viscous mass, urea is added. The thermosetting liquid bonding agent may be produced by reacting the following components:

Example 2

| | Grams |
|---|---|
| Resorcin | 80 |
| Phenol | 20 |
| Alcohol | 150 |
| 37% formaldehyde | 100 |
| Urea | 2 |

The resorcin and phenol are dissolved in the alcohol and thereafter, the formaldehyde is slowly stirred in the solution. The solution is then heated to boiling and cooled to room temperature. Thereafter, the urea is added.

Another example of the preparation of the thermosetting wetting resin utilized in carrying out the present invention is as follows:

Example 3

| | Grams |
|---|---|
| Phenol | 100 |
| 37% formaldehyde | 100 |
| NaOH | 2 |
| Resorcin resin | 15 |

The phenol and formaldehyde are mixed and then there is added to the mixture sodium hydroxide dissolved in a few grams of water. Thereafter, the mixture is slowly warmed to a boiling point and then chilled to room temperature. At this point, there is stirred in the mixture 15 grams of resorcin resin produced as herein set forth or by any equivalent method, the resorcin resin being dissolved in the mixture.

The following is a further example of a thermosetting wetting agent used in carrying out the present invention:

Example 4

| | Grams |
|---|---|
| Resorcin | 10 |
| Phenol | 90 |
| 37% formaldehyde | 90 |
| NaOH | 2 |

The resorcin is mixed with 70 grams of phenol and formaldehyde and heat is applied slowly so that the mixture reaches a temperature of 75° C. in about one hour, where it is held for about 30 minutes before being cooled to about 30 to 35° C. The sodium hydroxide is dissolved in water, there is thereafter added thereto about 20 grams of phenol, and the mixture is then cooled to about 30 to 35° C. The phenol dissolved in sodium hydroxide is then mixed with the resorcin phenol-formaldehyde mixture, care being taken that the solution is slowly poured into the mixture with vigorous stirring. The entire mixture is then slowly heated to boiling, refluxed for about 5 minutes, and cooled. The liquid resin is then ready for use. If it is desired to keep this solution for any length of time, it is desirable to neutralize it to a pH of 7.0 with lactic acid or any compatible acid, all of the common acids being compatible.

The above examples are to be considered illustrative of the preparation of a suitable thermosetting wetting agent and not by way of limitation. It is clear that the proporions of resorcin, formaldehyde, and/or phenol may be varied in accordance wih the desired characteristics of the thermo-setting agent.

It is desired to point out that it is satisfactory to use as the catalyzing agent in the preparation of the thermosetting wetting resin, an alkaline catalyst, since the catalyst only induces the presence of a relatively small amount of alkali in the resin, and further, only a small portion of the thermosetting wetting resin is present as a constituent of the complete abrasive article. In the final molded abrasive article, the alkali is not present in a sufficient amount to produce any appreciable break-down in the presence of frictional heat.

When a wetting agent is employed, the "green" mass containing the abrasive particles, the resorcin bonding agent, and the wetting agent is pressed into the desired shape in a manner now standard in the art. The "green" mass may be pressed into molds which are either heated or cold.

When cold molds are used, the shaped but still "green" article is removed from the cold mold and placed in a baking oven or an autoclave and heat treated. In using oven treatment, a low temperature curing cycle is employed, resulting in considerable savings of time and heat during the curing operation. The temperature and time of curing may be 4 hours at 80° C., or 4 hours at 100° C., or 4 hours at 120° C. The time of cure is illustrative and is not to be taken by way of limitation. The curing time will depend on the size of the article being cured, articles of thin cross section curing in less time. The point that it is desired to make is that, using the resorcin resin bonding agent, the abrasive article will cure at a much lower temperature than a similar abrasive article bonded by prior art phenolic condensation products.

Instead of cold molding, heated molds may be employed to form and cure the green abrasive mixture or the dry resin and abrasive mixture. Preferably the molds may be heated to between 115 to 120° C. and the article pressed for an exceedingly short time period depending upon the thickness of the article. For example, a green wheel 12 inches in diameter and ⅛ inch thick can be pressed in a heated mold at the low temperature specified for a period of 5 minutes, and after removal from the heated mold no further heat treatment or baking is necessary. It is desired to point out that this is a new departure in the curing of formed abrasive articles, as prior to the present invention, the phenolic-aldehyde resins were commonly used as the bonding agent and it was necessary when curing a grinding wheel ⅛ inch in thickness to cure for from 25 to 30 minutes at a temperature of 300 to 350° F. to completely set the resin. This procedure has two disadvantages: first, the long period of cure ties up the molds for a considerable period of time and reduces the rate of production per day; and, second, the high temperature employed, namely, 300 to 350° F., tends to result in a burning or decomposition of the surface of the formed abrasive article. In accordance with the present invention, a low temperature may be employed for the curing step, said temperature varying between 100 to 125° C., said low temperature being due to the use of the dihydroxy benzene-aldehyde resin. Therefore, in accordance with the present invention, very thin articles may be efficiently and economically cured in heated molds, and, further, abrasive articles carrying the herein disclosed bonding medium, having a thickness of as much as two inches, may be cured very efficiently and economically in less than one-half hour. This could not be done economically by employing the prior art phenol-aldehyde condensation products or resins.

It is desired to point out that the characteristics of the finished abrasive article may be varied within rather wide limits by varying the amounts of resin, the amounts of abrasive particles, and the amounts of fillers and extenders commonly used in the art. Further, characteristics of the abrasive articles may be varied by varying the pressure employed in shaping and/or hot pressing.

It is desired to point out that the curing temperature of the prior art phenolic resins may be modified by incorporating therein a substantial portion of the herein disclosed resorcin bonding resin. In other words, mechanical mixtures of resorcin with phenol, xylenol, cresols, and other mono- or polyhydric phenols may be reacted with aldehydes to form an abrasive bonding or cementing medium which has desirable low temperature curing properties. For example, if the resin of the present invention cures at 100° C. or 105° C., and there is added thereto a small proportion, as for example, 10% of a phenol condensation product, the temperature of curing of the composite resin will be about 105° C. If 20% of a resin having a melting point in the neighborhood of 135° to 150° C., is added to a dihydroxy-aldehyde resin such as a resorcin-aldehyde resin, the composite resin cures at 110° C. In the examples, the composite resin is a mechanical mixture of prior art phenolic resins with the herein described resorcin resin. While in order to obtain a low curing resin, it is preferred that the composite resin contain at least 75% of the resorcin bonding or cementing resin with which the abrasive is bonded or cemented, this percentage may be considerably varied. For example, in a mixture of a resorcin resin and a prior art phenol resin, there may be present from 25 to 75% of the resorcin resin and 75 to 25% of the standard two-step phenol-aldehyde resins.

While the present invention has been illustrated with a resorcin-aldehyde resin as the bonding and cementing agent for the abrasive particles, it is within the province of the invention to react a dihydroxy benzene with the aldehyde to form the initial resin product and then to mix this with a methylene-containing hardening agent. More specifically, for the resorcin there may be substituted catechol and hydroquinone.

The dihydroxy benzenes, including resorcin, utilized in carrying out the present invention, may be the commercial grades, or said dihydroxy benzenes including resorcin may contain appreciable percentages of monohydric phenols, as for example, phenol. The resorcin may also contain diresorcin.

It is desired to point out that the initial reaction product of the dihydroxy benzene and particularly resorcin with an aldehyde solidifies to a brittle and grindable resin. This resin is permanently fusible and needs the addition of methylene groups in order to make it a heat convertible product. As hereinbefore set forth, the addition of methylene groups may be furnished by powdered hexamethylenetetramine, of which 8 to 12 parts may be mixed with 100 parts of the powdered resin.

The dihydroxy benzene-aldehyde initial condensation product may be produced by using an acid catalyst or a neutral catalyst.

Instead of using the thermo-setting wetting agent having characteristics close to the primary dihydroxy benzene-aldehyde cementing resin, other wetting agents may be used such as furfural, benzaldehyde, alcohols, and even water itself.

It is desired to point out that at the temperature of curing, the dihydroxy benzene-aldehyde initial condensation product is converted in the presence of a methylene-containing hardening agent to an infusible mass insoluble in water and most alkalis and acids.

In accordance with the present invention, there has been provided an abrasive article comprising abrasive grains bonded together with the heat hardened reaction product of a dihydroxy benzene-aldehyde resin and a methylene-containing hardening agent therefor. The bonding and cementing agent preferably comprises the heat hardened reaction product of a dihydroxy benzene-aldehyde resin together with a thermo-setting dihydroxy benzene-aldehyde wetting agent, the preferred dihydroxy benzene being resorcin.

The dihydroxy benzene two-step resin herein disclosed may be used as a bonding and cementing medium in the production of sandpaper and similar articles in which shaping or molding is not necessary.

Referring to the liquid thermo-setting wetting resin set forth in Example 1, the urea is added at the end of the reaction to react with any residual formaldehyde which may be present. It has been found that it is highly advantageous to tie up the small amount of unreacted formaldehyde present in the reaction mass in order to prevent the formaldehyde vapors from becoming objectionable during the final curing of the resin and during the use of the resin. Instead of using urea, a small amount of resorcin may be added or any resorcin substitution product, provided the latter has a high speed of reaction at a low temperature, which is eminently desirable. The amount of formaldehyde neutralizing agent which is added at the end of the reaction to tie up or neutralize the small amount of aldehyde present, as for example, formaldehyde, will vary in amount according to the character of the reacting ingredients and the specific manner in which the resin reaction is carried out. In general, the quantity of this neutralizing agent will vary between 2 to 5% taken on the weight of the resorcin or resorcin-monohydric phenol-mixture which is being reacted. The amount may vary to 10%, but this is unusual.

The term "liquid resin" is intended to define a resin in which the degree of polymerization is so low that the product, when cooled to room temperature, still remains fluid.

Having thus described the invention, what is claimed as new and desired to be secured by Letters Patent is:

1. The method of manufacturing abrasive articles comprising mixing a mass of abrasive particles with a heat-hardenable adherable mixture of a dihydroxy benzene-aldehyde resin and a methylene-containing setting and hardening agent in a quantity to harden the resin, and curing the mixture of the abrasive particles and the resin mixture at a temperature varying from 80° to 125° C. whereby the resin is converted into a hard infusible insoluble cementing medium cementing the abrasive particles together.

2. The method of manufacturing abrasive articles comprising wetting a mass of abrasive particles with a liquid thermosetting thermoplastic dihydroxy benzene-aldehyde resin, mixing the resulting mass with a heat-hardenable mixture of a dihydroxy benzene-aldehyde resin and a methylene-containing setting and hardening agent in a quantity to harden the resin, and curing the mixture of abrasive particles and hardenable resins at a temperature varying from 80° to 125° C. whereby the resin components are converted to a hard cementing medium cementing the abrasive particles together.

3. The method of manufacturing abrasive articles comprising wetting a mass of abrasive particles with a liquid thermosetting resorcin-aldehyde resin, mixing the resulting mass with a heat-hardenable mixture of a resorcin-aldehyde resin and a methylene-containing setting and hardening agent in a quantity to harden the resin, and curing the mixture of abrasive particles and hardenable resins at a temperature varying from 80° to 125° C. whereby the resin components are converted to a hard cementing medium cementing the abrasive particles together.

4. The method of manufacturing abrasive articles comprising wetting a mass of abrasive particles with a liquid thermosetting wetting agent containing a phenol-aldehyde resin and a resorcin-aldehyde resin, mixing the resulting mass with a heat-hardening mixture of a dihydroxy benzene-aldehyde resin and a methylene-containing setting and hardening agent in a quantity to harden the resin, and curing the mixture of abrasive particles and hardenable resins at a temperature varying from 80° to 125° C., whereby the resin components are converted to a hard cementing medium cementing the abrasive particles together.

5. The method of manufacturing abrasive articles comprising mixing a mass of abrasive particles with a heat hardenable adherable reaction product of a dihydroxy benzene, a monohydric phenol compound, and an aldehyde; and a methylene-containing seting and hardening agent in an amount to harden said reaction product, and curing the mixture of the abrasive particles and the resin mixture at a temperature varying from 80° to 130° C. whereby the resin is converted into a hard infusible insoluble cementing medium cementing the particles together.

6. The method of manufacturing abrasive articles comprising mixing a mass of abrasive particles with a heat hardenable adherable reaction product of a dihydroxy benzene, a monohydric phenol compound, and an aldehyde, said reaction product containing less than 1% of water, mixing therewith a methylene-containing setting and hardening agent in an amount to harden said reaction product, and curing the mixture of abrasive particles and the resin mixture at a temperature varying from 80° to 130° C. whereby the resin is converted into a hard infusible insoluble cementing medium cementing the particles together.

7. The method of manufacturing abrasive articles comprising treating a mass of abrasive particles with an adherable mixture of a methylene-containing hardening agent and the heat-hardenable thermoplastic reaction product of a dihydroxy benzene, a monohydric benzene, and an aldehyde in the presence of a catalyst present only towards the end of the reaction between said dihydroxy benzene, monohydric benzene and aldehyde, whereby premature gellation of the reaction product is inhibited and dehydration of the resin is facilitated, the dihydroxy benzene being present in a predominating proportion, said resin on being cured forming a tough continuous homogeneous film on said abrasive particles, and curing the resulting mixture at a temperature below 130° C. whereby the resin reaction product is converted into a hard, infusible, insoluble cementing medium cementing the abrasive particles together.

8. The method of manufacturing abrasive articles comprising wetting a mass of abrasive particles with 1% to 5% of a wetting agent having a thermoplastic dihydroxy benzene-aldehyde component, mixing the resulting mass with a mixture of a heat-hardenable permanently fusible dihydroxy benzene resin and a methylene-containing setting and hardening agent, the former being present in an amount varying from 5% to 15% taken on the weight of the abrasive particles, and the latter in an amount varying from 8% to 12% taken on the weight of said heat-hardenable resin, and curing the resulting mixture at a temperature below 130° C. and thereby converting the resin reaction product into a hard, tough, infusible, insoluble, homogeneous cementing medium cementing the abrasive particles together.

9. The method of manufacturing abrasive articles, comprising adherently coating a mass of abrasive particles with a heat-hardenable permanently fusible reaction product of an aldehyde and a mixture of resorcin and a monohydric phenol; and a reactive methylene-containing setting and hardening agent, and curing the resulting mixture of abrasive particles and resin at a temperature varying from 80° to 130° C. and thereby converting the resin into a hard infusible insoluble cementing medium cementing the abrasive particles together.

10. The method of manufacturing abrasive articles comprising adherently coating a mass of abrasive particles with a heat-hardenable mixture of a permanently fusible, brittle, substantially dehydrated resorcin-aldehyde resin and a methylene-containing hardening and setting agent therefor in an amount to harden the resin, and curing the resulting mass at a temperature varying from 80° C. to 125° C., and converting the resin into a hard insoluble infusible cementing medium cementing the abrasive particles together.

11. An abrasive article comprising abrasive grains bonded together with and carrying continuous films of the heat-hardened reaction product of a mixture of a permanently fusible dihydroxy benzene-aldehyde resin and a reactive methylene-containing setting and hardening agent therefor, said dihydroxy benzene-aldehyde resin having the property of curing in the presence of said setting and hardening agent at a temperature varying from 80° C. to 125° C.

12. An abrasive article comprising abrasive grains bonded together with and carrying continuous films of the heat-hardened reaction product of a mixture of a permanently fusible resorcin-aldehyde resin and a reactive methylene-containing setting and hardening agent therefor, said resorcin-aldehyde resin having the property of curing in the presence of said setting and hardening agent at a temperature varying from 80° C. to 125° C.

13. An abrasive article comprising abrasive grains bonded together with and carrying continuous films of the heat-hardened reaction product of a mixture of a permanently fusible resorcin-formaldehyde resin and a reactive methylene-containing setting and hardening agent therefor, said resorcin-formaldehyde resin having the property of curing in the presence of said setting and hardening agent at a temperature varying from 80° C. to 125° C.

14. An abrasive article comprising abrasive grains bonded together with and carrying continuous films of the heat-hardened reaction product of a mixture of a permanently fusible resorcin-aldehyde resin and a reactive methylene-containing setting and hardening agent therefor, said resorcin-aldehyde resin containing less than 1% of water and having the property of curing in the presence of said setting and hardening agent at a temperature varying from 80° C. to 125° C.

15. An abrasive article comprising abrasive grains bonded together with and carrying continuous films of the heat-hardened permanently fusible copolymerized reaction product of an aldehyde and a mixture comprising a dihydroxy benzene together with a monohydric phenol; and a reactive methylene-containing setting and hardening agent for said copolymerized resin, said copolymerized resin having the property of curing in the presence of said setting and hardening agent at a temperature below 130° C.

16. An abrasive article comprising abrasive grains bonded together with and carrying continuous films of the heat-hardened permanently fusible copolymerized reaction product of an aldehyde and a mixture of resorcin and a monohydric phenol; and a reactive methylene-containing setting and hardening agent for said copolymerized resin.

PHILIP HAMILTON RHODES.